(12) United States Patent
Salazar et al.

(10) Patent No.: US 7,247,801 B2
(45) Date of Patent: Jul. 24, 2007

(54) SYSTEM AND METHOD FOR FAST WEIGHING OF ITEMS SUCH AS MAILPIECES

(75) Inventors: Edilberto I. Salazar, Brookfield, CT (US); Michael J. Kasmin, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 764 days.

(21) Appl. No.: 10/165,161

(22) Filed: Jun. 7, 2002

(65) Prior Publication Data

US 2003/0229600 A1  Dec. 11, 2003

(51) Int. Cl.
*G01G 19/40*  (2006.01)

(52) U.S. Cl. .................. 177/1; 177/25.15; 702/173; 705/414

(58) Field of Classification Search ............. 177/1, 177/25.11, 25.15; 702/173, 175; 705/401, 705/414, 415, 407
See application file for complete search history.

(56) References Cited

U.S. PATENT DOCUMENTS

| | | | | |
|---|---|---|---|---|
| 3,800,893 | A * | 4/1974 | Ramsay et al. | 177/25.14 |
| 3,835,945 | A * | 9/1974 | Yamanaka et al. | 177/134 |
| 4,347,903 | A * | 9/1982 | Yano et al. | 177/25.13 |
| 4,351,033 | A | 9/1982 | Uchimura et al. | 364/900 |
| 4,516,209 | A | 5/1985 | Scribner | 364/466 |

(Continued)

FOREIGN PATENT DOCUMENTS

JP  60-152920  * 8/1985
JP  63-214623  * 9/1988

OTHER PUBLICATIONS

News Release "Expand Your Measurements Horizons with the new Omega DP-80 Series Digital Indicators"; Aug. 21, 1986.*

*Primary Examiner*—Randy W. Gibson
(74) *Attorney, Agent, or Firm*—Brian A. Lemm; Angelo N. Chaclas

(57) ABSTRACT

A system and method for fast weighing of items such as mailpieces. The system includes a scale system having a platform connected to a load cell that provides an output signal to an analog-to-digital converter. The resulting digital output signal is processed by a low pass filter and analyzed by a microprocessor to determine weights of items on the platform. The microprocessor also determines postage amounts of items on the platform. The microprocessor also determines postage amounts as functions of the weights and outputs these postage amounts to a postage meter. The microprocessor determines the weights as the median of the peak to valley difference of the digital output signal when the digital output signal peak to valley difference is less than a predetermined value. The microprocessor identifies peaks and valleys of the digital output signal by determining when the derivative of the signal changes sign. The microprocessor uses the determined first peak value to determine if the weight is below the first weight break point. The microprocessor also estimates the weight as an average of a sum of medians for N preceding cycles if the digital output signal does not converge. The postage meter initially assumes that all mailpieces have a minimum postage amount due and corrects the postage amount when a weight signal is received from the microprocessor so as to take advantage of the fact that the majority of mailpieces require only a minimum postage amount.

40 Claims, 7 Drawing Sheets

U.S. PATENT DOCUMENTS

| | | | |
|---|---|---|---|
| 4,715,457 A | * 12/1987 | Amacher et al. | 177/1 |
| 4,742,878 A | 5/1988 | Freeman et al. | 177/25 |
| 4,787,048 A | 11/1988 | Freeman et al. | 364/466 |
| 5,119,306 A | 6/1992 | Metelits et al. | 364/464.02 |
| 5,172,783 A | 12/1992 | Feinland et al. | 177/185 |
| 5,178,228 A | 1/1993 | Feinland et al. | 177/185 |
| 5,190,115 A | * 3/1993 | Dolan et al. | 177/25.15 |
| 5,226,496 A | * 7/1993 | Feinland et al. | 177/25.15 |
| 5,585,604 A | * 12/1996 | Holm | 177/133 |
| 5,717,166 A | 2/1998 | Talmadge | 177/25.13 |
| 5,723,825 A | 3/1998 | Dolan et al. | 177/145 |
| 6,839,694 B2 | * 1/2005 | Kasmin et al. | 705/407 |

* cited by examiner

SYSTEM AND METHOD FOR FAST WEIGHING OF ITEMS SUCH AS MAILPIECES

BACKGROUND OF THE INVENTION

The present invention relates to a system and method for rapid weighing of items. More particularly it relates to scale systems used in postage metering systems to weigh, and determine postage for, mailpieces or the like.

Postal scale systems are well known. Such scale systems weigh a mailpiece and determine the appropriate postage for that mailpiece as a function of the weight. Postal mailing systems where a mailpiece is transported onto a postage scale system, the appropriate postage is determined, and the mailpiece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mailpiece in order that the throughput of the system can be increased.

U.S. Pat. No. 4,787,048; issued: Nov. 22, 1988, discloses one approach to decreasing the time required for a postage scale system to determine the weight of a mailpiece. The system disclosed in this patent takes advantage of the structure of postage rate charts, i.e., the function that relates the weight of the mailpiece to the appropriate postage amount. Such rate charts provide a constant postage value for all weights between a pair of predetermined weight breaks. The system of the '048 patent takes advantage of this by use of an algorithm where a first estimate of the weight is made and used to determine the postage amount unless the first estimate is within a predetermined distance of a break point, in which case a second more accurate estimate is made.

A basic cause of the delay in determining weight for a mail piece is the tendency for a scale system to oscillate in response to the arrival of the mailpiece on the system. These oscillations are damped, but only slowly arrive at a new stable output value representative of the weight of the mail piece. Heretofore systems have relied on an averaging process over a number of samples taken over a number of cycles of the oscillations to approximate the weight output. While systems using such averaging type algorithms have generally proved satisfactory in the past, presently they are approaching limits such that it is difficult to increase the throughput of postage metering systems using such algorithms. This problem can be exacerbated by the presence of external vibrations, which can slow or even prevent the scale system output from converging to a sufficiently accurate approximation of the weight.

Thus it is the object of the present invention to provide a scale system, and a postage metering system incorporating such scale system, which can more rapidly determine the weight of a mailpiece or the like.

BRIEF SUMMARY OF THE INVENTION

The above object is achieved and the disadvantages of the prior art are overcome in accordance with the subject invention by a method and system for determining a weight for an item, where a scale system generates a digital output signal. The scale system includes: a support for supporting the item; a transducer for generating the digital output signal, the signal being representative of an instantaneous response of the support; a data processing system for, in response to the digital output signal, detecting presence of the item on the support; and then determining if a next peak to valley difference in the digital output signal is less then a predetermined value; and, if so, determining the weight to be equal to a median of the next peak and valley and exiting; and otherwise returning to determine a next peak to valley difference in sequence.

In accordance with another aspect of the present invention, the peaks are identified by determining when a first derivative of the digital output signal changes from positive to negative, and the valleys are identified by determining when the first derivative changes from negative to positive.

In accordance with another aspect of the present invention, the weight is determined only if the difference is less than one-half of an immediately previous difference.

In accordance with still another aspect of the present invention, the data processing system returns to determine if a next peak to valley difference only for a predetermined number of times; and then determines the weight to be an average of the predetermined number, or a lesser sufficient number, of previous medians.

In accordance with still another aspect of the present invention weights are determined with at least sufficient accuracy to assure that the weight is within one of a plurality of ranges, the ranges being bounded by break weights, the scale system is critically damped or overdamped, and the data processing system responds to the digital output signal detecting presence of the item on the support to determine if a first peak in the digital output signal is less than a lowest of the break weights and, if so, determines the weight to be in a lowest of the ranges; and otherwise determines if a next peak to valley difference in the digital output signal is less then a predetermined value; and, if so determines the weight to be equal to a median of the next peak and valley and exits; and otherwise returns to determine if a next peak to valley difference in sequence is less then the predetermined value.

In accordance with another aspect of the present invention, the predetermined value is a predetermined fraction of the smallest of the ranges.

In accordance with still another aspect of the present invention, the items are mailpieces and postage for the mailpieces is determined by the ranges.

In accordance with still another aspect of the present invention, the system includes a postage metering system responsive to the data processing system for franking the mailpieces, and the postage meter responds to detection of the mailpiece to debit a vault for a minimum postage amount corresponding to the lowest range and then later debits the vault for an additional postage amount only if the first peak is greater than the lowest break weight.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
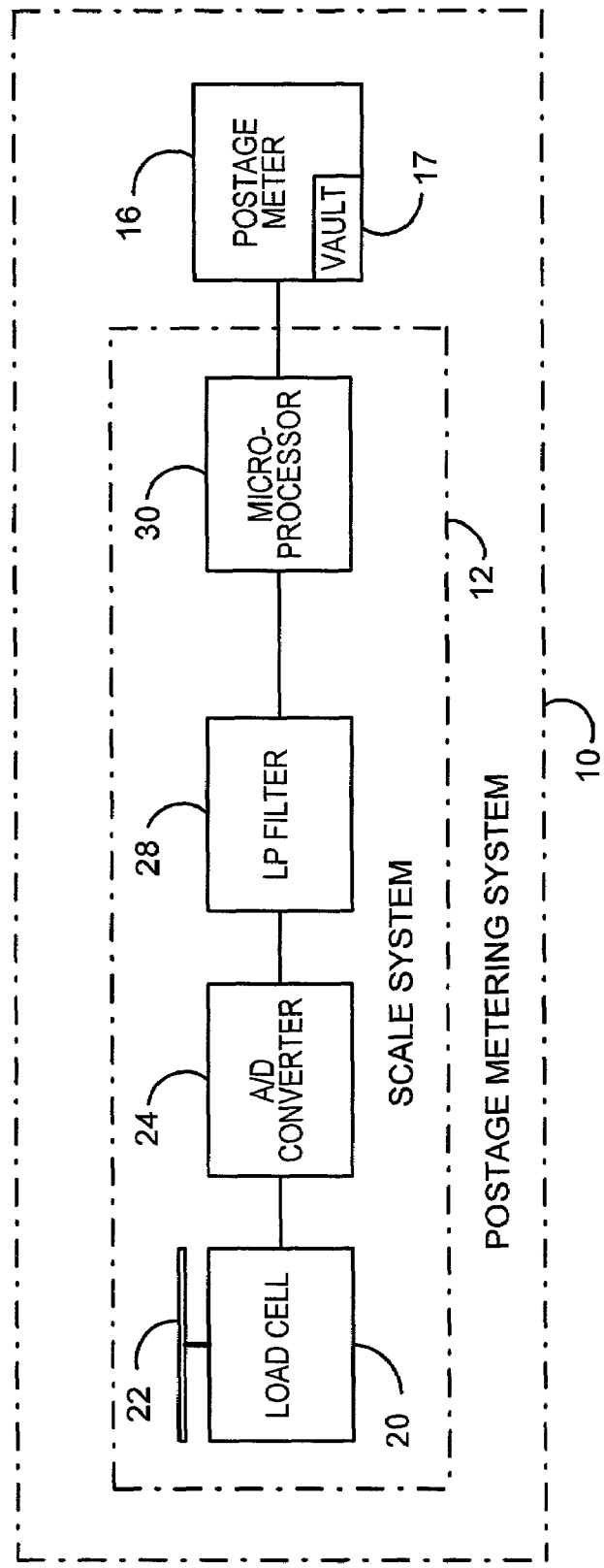
FIG. 1 shows a schematic block diagram of a postage metering system including a scale system.

In FIG. 1 postage metering system 10 includes scale system 12 and postage meter 16. Postage meter 16 includes vault 17 (i.e. secure accounting registers) and is programmed in accordance with the present invention to quickly account for mailpieces requiring only minimum postage. Scale system 12 includes load cell 20, producing a response (shown in FIGS. 2 and 4) to the force from platform 22; analog-to digital converter 24, for converting the output of load cell 20 to a sequence of digital values; low pass filter 28; and microprocessor 30, for processing a filtered output to determine a weight and provide an output representative of the postage corresponding to that weight to postage meter 16. In accordance with the present invention microprocessor 30 is programmed with a novel algorithm for rapid identification of mailpieces that are less than a predetermined first break weight, which require only minimum postage, and for rapid estimation of a weight for mailpieces that exceed the first break weight. (While filter 28 is shown as a separate element in FIG. 1 for simplicity of illustration, it should be noted that filter 28 can be, and preferably is, implemented by software running in microprocessor 30.)

In the embodiment shown in FIG. 1 load cell 20, converter 24, and filter 28 form a transducer for generating a digital output signal representative of the response of scale system 12. Other embodiments, where other types of transducers generate the representative signal, are also within the contemplation of the present invention.

Figure 2:
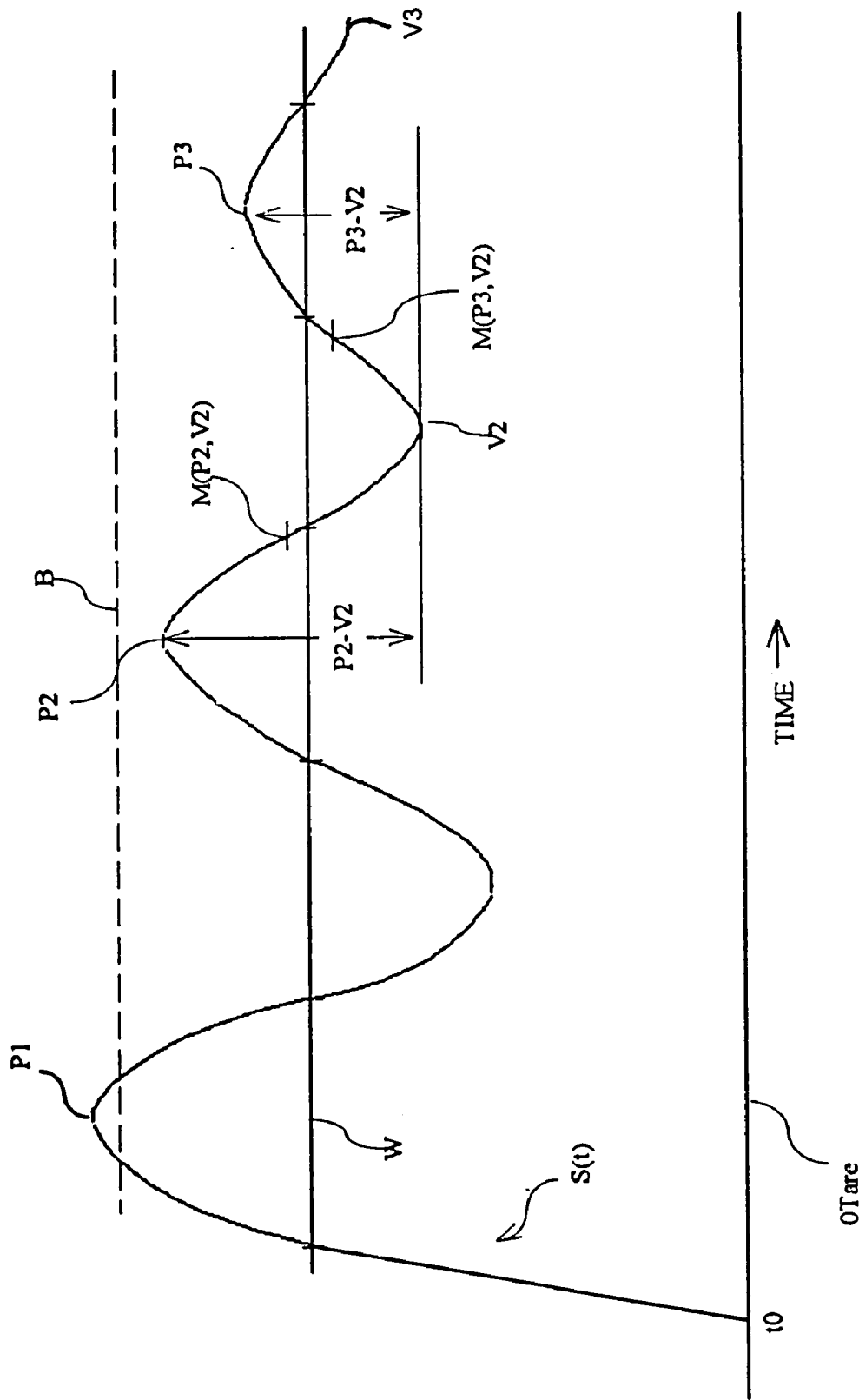
FIG. 2 shows a graphic representation of the response of the scale system of FIG. 1 to a mailpiece.

FIG. 2 shows the response of scale system 12 when a mailpiece arrives on platform 22, i.e., the displacement of platform 22 and the corresponding analog signal S(t) produced by load cell 20. Signal S(t) can be modeled as a damped sinusoid, which varies about a level W representative of the weight of the mailpiece. Prior to time t0 signal S(t) varies about a 0 tare level representative of the weight of platform 22 without any additional load, and at time t0 rises to first peak P1. Since scale system 12 will be critically damped, or overdamped, peak P1 will be the maximum value of signal S(t); and, if peak P1 does not exceed first break weight B, it can be assumed that the weight of the mailpiece is in a lowest range and the mailpiece will require minimum postage, as will be discussed further below. If P1 exceeds break weight B then, in accordance with the present invention, scale system 12 estimates the weight of the mailpiece by considering the difference between successive peaks and valleys; P2-V2, P3-V2, P3-V3, . . . When this difference is less than a predetermined amount for a peak, valley pair, Px, Vy, then scale system 12 estimates the weight as the median of that peak, valley pair, M(Px, Vy). e.g., M(P2, V2), M(P3, V2). Preferably the predetermined value is a fraction, preferably 1/10, of the minimum range for a given postal rate, typically one ounce, and the first break weight is one ounce.

Figure 3A:
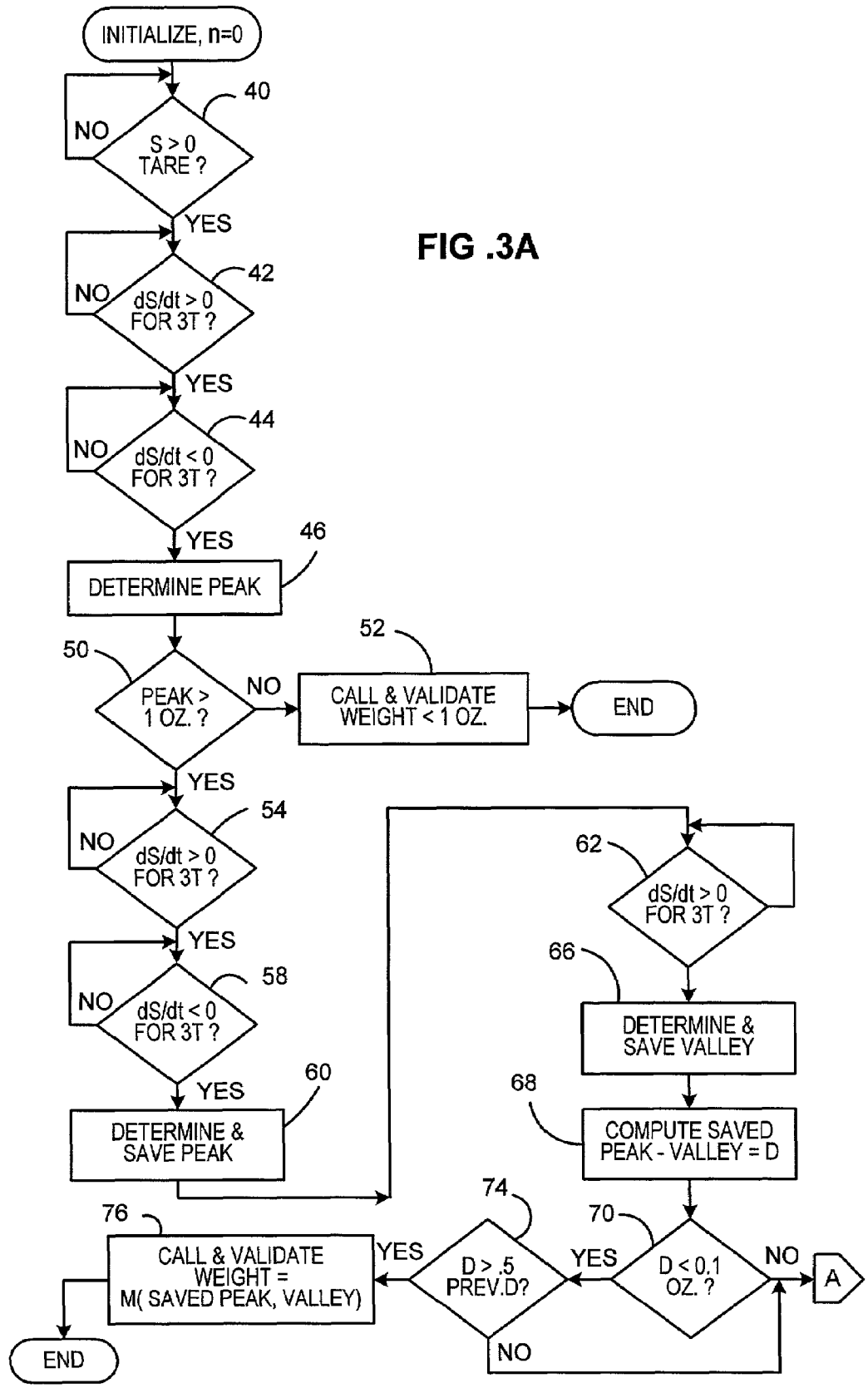
FIGS. 3A and 3B show a flow diagram of processing of the response of FIG. 2 by the scale system of FIG. 1 to determine the weight of a mailpiece.
Figure 3B:
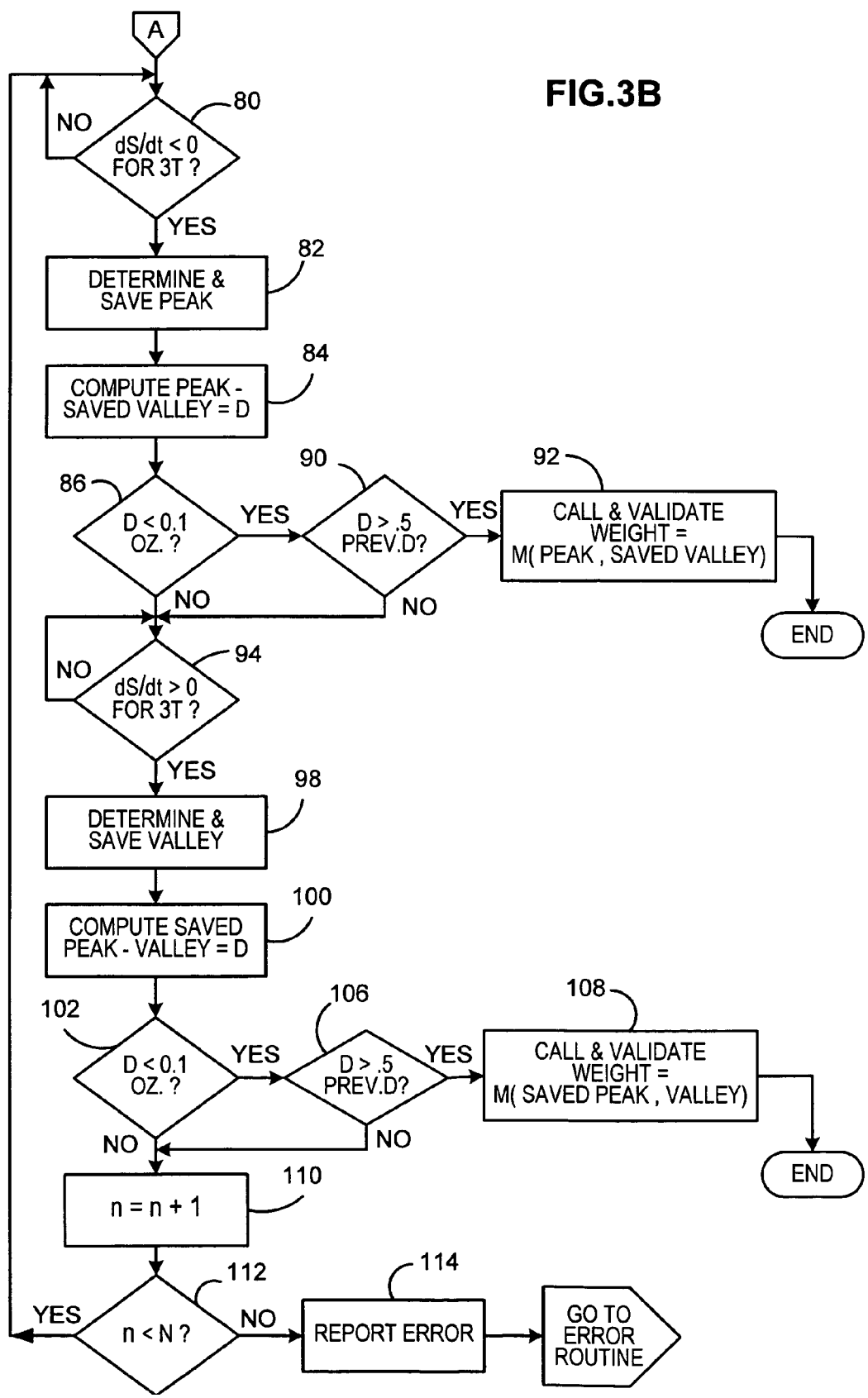

FIGS. 3A and 3B show a flow diagram for the operation of the microprocessor 30 in carrying out the algorithm described above with respect to FIG. 2. At step 40 microprocessor 30 tests determine if signal S is greater than the 0 tare and, if not, continues to loop through step 40. (Note that signal S is a sequence of digital values corresponding to samples of signal S(t).) Preferably these signals are taken at one or two milliseconds intervals, which is approximately an order of magnitude less than the sample interval for previous scale systems, so that dS/dt can be satisfactorily approximated as the difference between successive sample values of signal S(t).

Once signal S is determined to be greater than 0 then, at step 42, microprocessor 30 determines if dS/dt is greater than 0 for 3 successive sample intervals. By requiring that dS/dt be greater than 0 for 3 intervals, small high frequency perturbations are filtered out. Microprocessor 30 remains at step 42 until the condition is satisfied and then goes to step 44 to test if dS/dt is less than 0 for 3 successive sample intervals. Again, microprocessor 30 remains at step 44 until the condition is satisfied. Then at step 46 the peak is determined as the first value in the sequence of values identified at step 44, or in any other convenient manner.

Then at step 50 microprocessor 30 determines if the peak identified at step 46 is greater than the first break weight, which for the U.S. Postal Service is typically one ounce, and, if not, at step 52 calls and validates the weight as being less than one ounce, and exits. (Calling a weight, as used herein, means microprocessor 30 uses the current weight value to determine the postage for a mailpiece. Validating a weight, as used herein, means that microprocessor 30 calculates the net weight and insures that it is above 0 and within maximum scale limits.)

If the peak is greater than the first break weight B, then at step 54, microprocessor 30 again searches for three successive intervals where dS/dt is greater than 0, and, if not, continues to loop through step 54. Once the condition in step 54 has been satisfied, then in step 58 microprocessor 30 again searches for three successive intervals where dS/dt is less than 0, thereby identifying a second peak in signal S. Once the conditions at steps 54 and 58 are satisfied then at step 60 microprocessor 30 determines and saves the second peak.

Then at step 62 microprocessor 30 again searches for three successive intervals where dS/dt is greater than 0 to identify the next valley in signal S. Then at step 68 microprocessor 30 computes the difference between the peak value, saved at step 60, and the current valley value, determined at step 66.

At step 70 microprocessor 30 determines if this difference is less than a predetermined fraction of a minimum range, preferably less than 0.1 ounce and, if so, at step 74 determines if this difference is greater than ½ of the difference between the previous peak and valley pair. The test at step 74, and the same test at other steps described below, form a second filter to assure that high frequency perturbations do not cause a false determination of a peak or valley. If both conditions at step 70 and step 74 are satisfied, then at step 76 microprocessor 30 calls and validates the weight as the median of the peak and valley pair used to compute the difference at step 68 and then exits. The median could be identified, for example, by determining when a second derivative of the digital output signal changes from positive to negative. Otherwise microprocessor 30 goes to step 80 (shown in FIG. 3B).

At step 80 microprocessor 30 again tests to find 3 successive intervals where dS/dt is less than 0 to identify the next peak, and, if not, continues to loop through step 80.

Once three successive intervals where dS/dt is less than 0 are found, microprocessor 30 at step 82 determines and saves the next peak. At step 84 microprocessor 30 computes the difference between the current peak, determined at step 82, and the valley, saved at step 66.

Then at step 86 microprocessor 30 again determines if the peak to valley difference is less than 1/10 of an ounce, and at step 90 if the difference is greater than 1/2 of the previous peak to valley distance. If both conditions are satisfied then at step 92 microprocessor 30 calls and validates the weight as the median of the peak and valley pair used to compute the difference at step 84 and exits. The median could be identified, for example, by determining when a second derivative of the digital output signal 1 from positive to negative.

Otherwise, at step 94 microprocessor 30 again searches for three successive intervals where dS/dt is greater than 0, and, if not, continues to loop through step 94, to identify the next valley. Once 3 such intervals are found then, at step 98, microprocessor 30 determines and saves the valley. Then at step 100 microprocessor 30 computes the peak, saved at step 82, minus the current valley, determined at step 98.

Then at steps 102 and 106 microprocessor 30 again tests to determine if the difference computed at step 100 is less than 1/10 ounce and greater than 1/2 the previous difference and, if so, at step 108 calls and validates the weight as the median of the current peak, valley pair, and exits. The median could be identified, for example, by determining when a second derivative of the digital output signal changes from positive to negative. Otherwise, at step 110 microprocessor 30 increments counter n, at step 112 tests to determine if n is less than predetermined value N. If so microprocessor 30 returns to step 80 to identify the next peak. Note that now the saved valley used at step 84 will be the value saved at step 100.

If counter n is not less than N than at step 114 microprocessor 30 reports an error and goes to an error routine to make a further effort to determine the mailpiece weight as will be described further below with regard to FIGS. 5 and 6. Preferably N is approximately 10.

Figure 4:
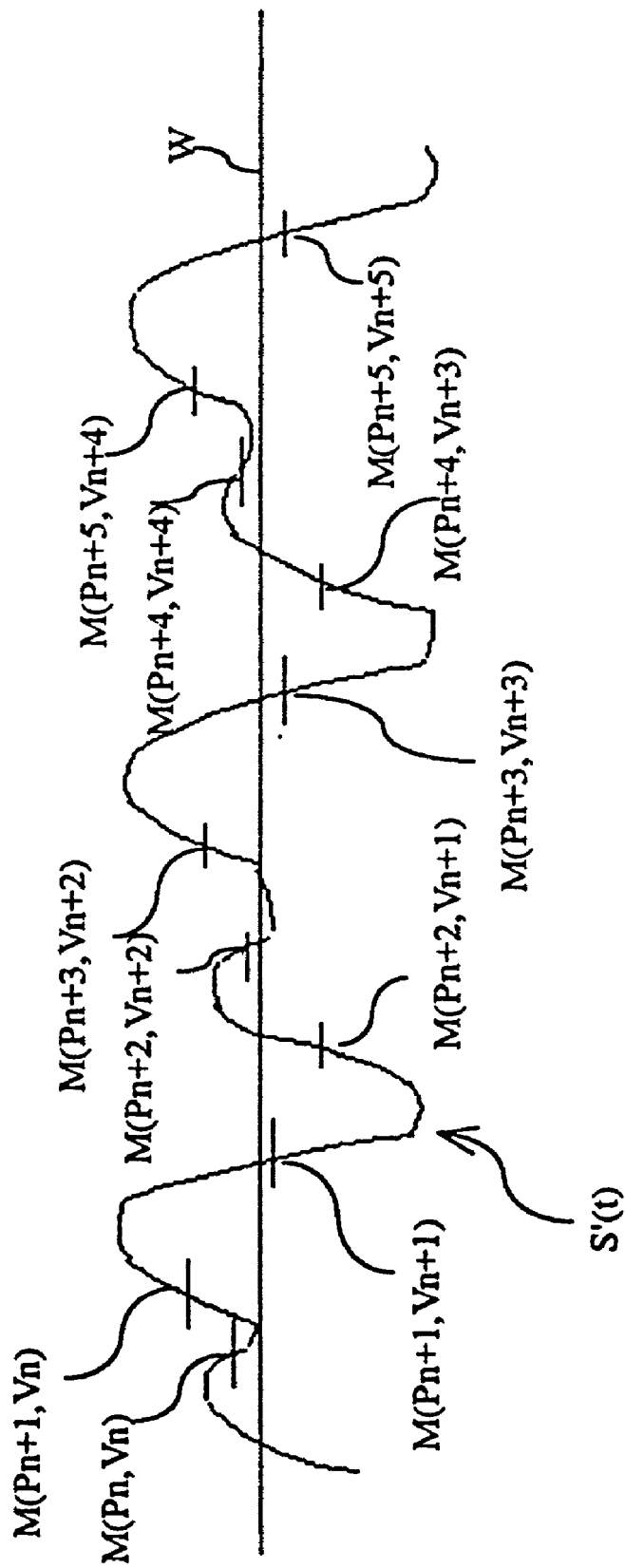
FIG. 4 shows a graphic representation of the response of the scale system of FIG. 1 to a mailpiece in the presence of external vibrations.

Failure of signal S to converge to a value of less than 1/10 ounce within N cycles is typically because of the presence of ground vibration. FIG. 4 shows a resulting output signal S'(t) which is the sum of the normal system response Aexp(−αt) sin (ωt) and ground vibration, which is assumed to have the form Dsin (φt). It is believed, as shown in FIG. 4, the resulting signal S'(t)=Aexp(−αt)sin(ωt)+D sin(φt) will be periodic even though the amplitude and range of the signal will vary. Therefore, it is believed that the average of the medians between the resulting peaks and valleys of the signal, M (Pn, Vn), M (Pn+1,Vn), M (Pn+1,Vn+1) . . . , shown in FIG. 4, will vary about the weight W of the mailpiece so that an average over a number of cycles will give a reasonable estimate of weight W.

Figure 5:
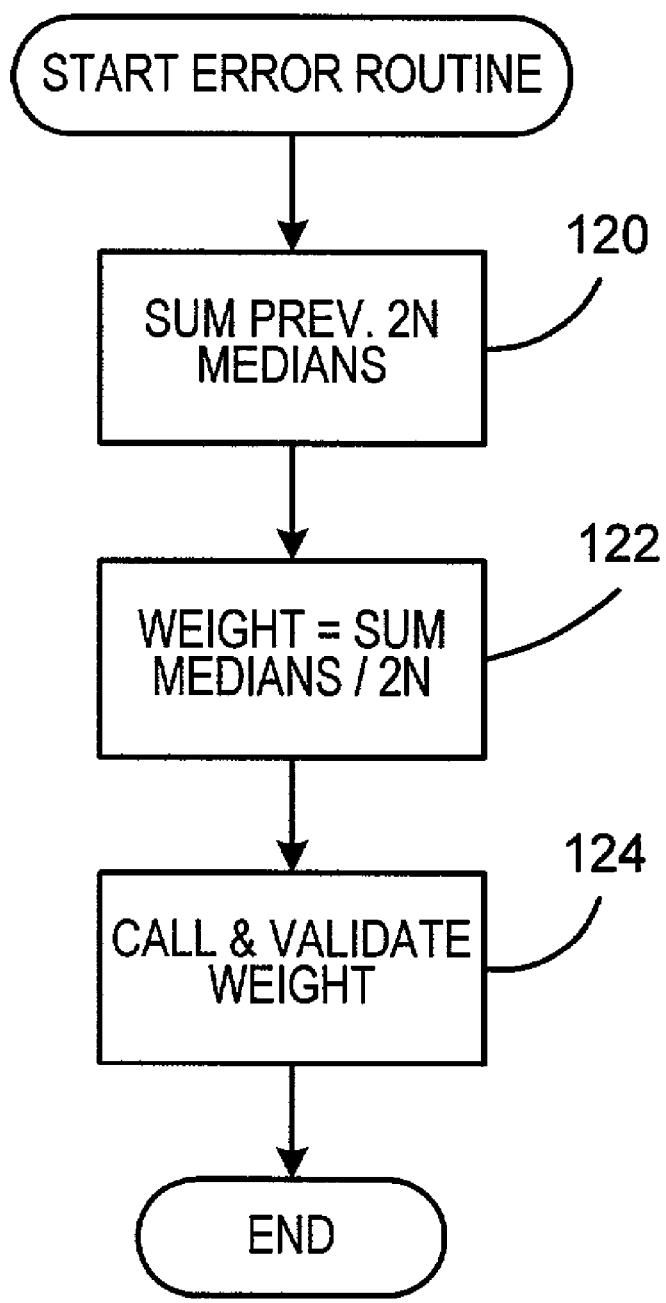
FIG. 5 shows a flow diagram of processing of the response of FIG. 4 by the scale system of FIG. 1 to determine the weight of a mailpiece.

FIG. 5 shows a flow diagram for the operation of the microprocessor 30 in carrying out the algorithm described above with respect to FIG. 4. At step 120 microprocessor 30 sums the previous 2N medians. Note that the value of 2N is used because counter n is only incremented for every other peak valley pair. Then at step 122 microprocessor 30 estimates the weight of the mail piece to be the sum of the medians divided by 2N, and at step 124 calls and validates the weight, and then exits.

While in the preferred embodiment described with regard to FIGS. 4 and 5 all of the 2N medians determined are averaged, in other embodiments, having different scale systems, it may be found that a lesser number of the medians are sufficient to determine a weight with sufficient accuracy. A person skilled in the art can determine if this is the case through simple experimentation.

Those skilled in the art will recognize that, in general, a significant majority of mailpieces require only the minimal postage, i.e., are less than the first weight break. Postage metering system 10 takes advantage of this in accordance with the present invention by making an early determination of weights less than the first weight break as described above and by modifying the accounting for postage expended by postage meter 16 as is described below with regard to FIG. 6.

Figure 6:
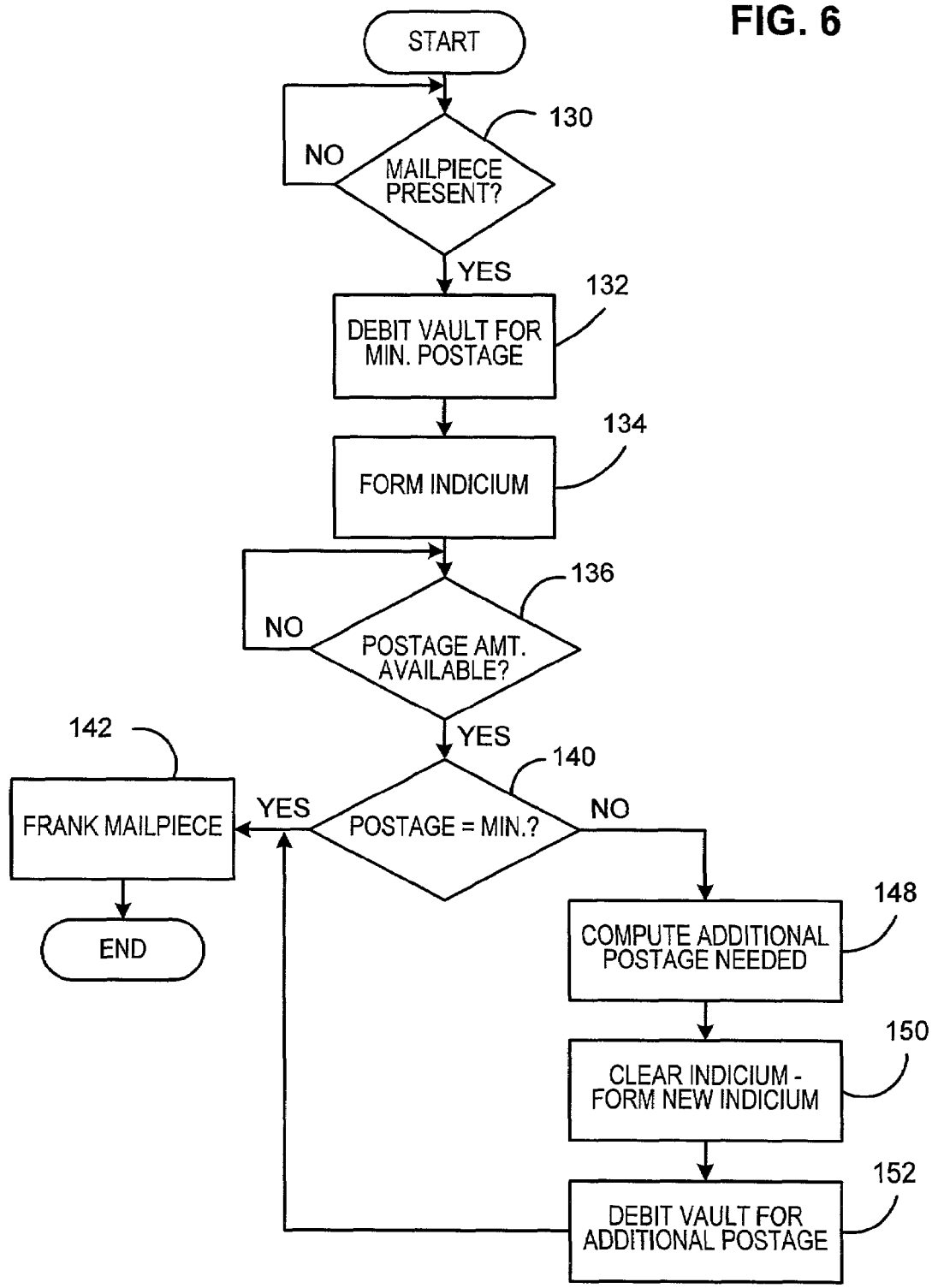
FIG. 6 shows a flow diagram of postage accounting for a mailpiece weighing less than 1 ounce by the postage metering system of FIG. 1.

In FIG. 6 at step 130 postage meter 16 waits for the presence of a mailpiece on platform 22, and, if no mailpiece is present, continues to loop through step 130. When a mailpiece arrives on platform 22, at step 132, meter 16 debits vault 17 for the minimum postage amount, and at step 134 forms a corresponding indicium. Then at step 136 meter 16 waits for microprocessor 30 to send the postage amount, and, if the postage amount has not been sent, continues to loop through step 136. Once the postage amount has been sent in step 136, and therefore is available, at step 140 meter 16 determines if the postage amount is the minimum amount, and if so, at step 142 franks the mailpiece and exits. Otherwise, at step 148 meter 16 computes any additional postage needed, at step 150 clears the indicium and forms an appropriate new indicium, and at step 152 debits vault 17 for any additional postage, and goes to step 142 to frank the mailpiece with the new indicium. Note that debiting of vault 17 in a secure manner and franking of mailpieces so that postage expended is properly accounted for is well known to those skilled in the art and need not be described further here for understanding of the present invention.

The embodiments described above and illustrated in the attached drawings have been given by way of example and illustration only. From the teachings of the present application those skilled in the art will readily recognize numerous other embodiments in accordance with the subject invention. Particularly other modifications of various indicia printed with different geometries will be apparent. Accordingly, limitations on the subject invention are to be found only in the claims set forth below.

What is claimed is:

1. A system for determining a weight for an item, comprising:
   a) a scale system for generating a digital output signal, said scale system comprising:
      a1) a support for supporting said item; and
      a2) a transducer for generating said digital output signal, said signal being representative of an instantaneous response of said support and having a general waveform of a damped sinusoid; and
   b) a data processing system for, in response to said digital output signal:
      b1) determining if a first peak of said damped sinusoid is greater than a threshold value, said threshold value corresponding to a weight break between a lowest range of weight values and a second range of weight values;
      b2) if said first peak of said damped sinusoid is not greater than said threshold value, determining said weight to be in said lowest range of weight values;
      b3) if said first peak of said damped sinusoid is greater than said threshold value, determining a next peak and subsequent valley of said damped sinusoid; and b4) determining if a difference between said next peak and subsequent valley of said damped sinusoid is less than a predetermined value;

wherein if said difference between said next peak and said subsequent valley is less than said predetermined value, said weight is determined to be equal to a median of said next peak and said subsequent valley.

2. A system as described in claim 1 where said peaks are identified by determining when a first derivative of said damped sinusoid changes from positive to negative, and said valleys are identified by determining when said first derivative changes from negative to positive.

3. A system as described in claim 1 where said median is identified by determining when a second derivative of said damped sinusoid changes from positive to negative.

4. A system for determining a weight for an item with at least sufficient accuracy to assure that said weight is within one of a plurality of ranges, said ranges being bounded by break weights, said system comprising:
   a) a critically damped or overdamped scale system for generating a digital output signal, said scale system comprising:
      a1) a support for supporting said item; and
      a2) a transducer for generating said digital output signal, said signal being representative of an instantaneous response of said support and having a general waveform of a damped sinusoid; and
   b) a data processing system for, in response to said digital output signal:
      b1) determining if a first peak in said damped sinusoid is less than a lowest of said break weights and, if so, determining said weight to be in a lowest of said ranges; otherwise
      b2) determining if a second peak to second valley difference in said damped sinusoid is less than a predetermined value; and, if so
      b3) determining said weight to be equal to a median of said second peak and second valley.

5. A system as described in claim 4 where said predetermined value is a predetermined fraction of said lowest of said ranges.

6. A system as described in claim 5 where said predetermined fraction is approximately one-tenth.

7. A system as described in claim 4 where said peaks are identified by determining when a first derivative of said damped sinusoid changes from positive to negative, and said valleys are identified by determining when said first derivative changes from negative to positive.

8. A system as described in claim 4 where said median is identified by determining when a second derivative of said damped sinusoid changes from positive to negative.

9. A system as described in claim 4 where said items are mailpieces and postage for said mailpieces is determined by said ranges.

10. A system as described in claim 9 further comprising a postage metering system responsive to said data processing system for franking said mailpieces, said postage metering system responding to said digital output signal to debit a vault for a minimum postage amount corresponding to said lowest range and then later debiting said vault for an additional postage amount only if said first peak is greater than said lowest break weight.

11. A method for processing an output signal, generated by a scale system and having a general waveform of a damped sinusoid, to determine a weight for an item on said scale system, said method comprising the steps of:

a) determining if a first peak of said damped sinusoid is greater than a threshold value, said threshold value corresponding to a weight break between a lowest range of weight values and a second range of weight values;
   b) if said first peak of said damped sinusoid is not greater than said threshold value, determining said weight to be in said lowest range of weight values;
   c) if said first peak of said damped sinusoid is greater than said threshold value, determining a next peak and subsequent valley of said damped sinusoid;
   d) determining if a difference between said next peak and subsequent valley of said damped sinusoid is less than a predetermined value; and
   e) determining said weight to be equal to a median of said next peak and said subsequent valley if said difference between said next peak and said subsequent valley is less than said predetermined value.

12. A method as described in claim 11 where said peaks are identified by determining when a first derivative of said damped sinusoid changes from positive to negative, and said valley is identified by determining when said first derivative changes from negative to positive.

13. A method for processing an output signal, generated by a scale system and having a general waveform of a damped sinusoid, to determine a weight for an item on said scale system is within one of a plurality of ranges, said ranges being bounded by break weights, said method comprising the steps of:
   a) determining if a first peak in said damped sinusoid is less than a lowest of said break weights and, if so, determining said weight to be in a lowest of said ranges; otherwise
   b) determining if a second peak to second valley difference in said damped sinusoid is less than a predetermined value; and, if so
   c) determining said weight to be equal to a median of said second peak and second valley.

14. A method as described in claim 13 where said predetermined value is a predetermined fraction of said lowest of said ranges.

15. A method as described in claim 14 where said predetermined fraction is approximately one-tenth.

16. A method as described in claim 13 where said peaks are identified by determining when a first derivative of said damped sinusoid changes from positive to negative, and said valleys are identified by determining when said first derivative changes from negative to positive.

17. A method as described in claim 13 where said median is identified by determining when a second derivative of said damped sinusoid changes from positive to negative.

18. A method as described in claim 13 where said items are mailpieces and postage for said mailpieces is determined by said ranges.

19. A method as described in claim 18 further comprising:
   debiting a vault for a minimum postage amount corresponding to said lowest range in response to said output signal; and
   subsequently debiting said vault for an additional postage amount only if said first peak is greater than said lowest break weight.

20. A system as described in claim 1, wherein if said difference between said next peak and said subsequent valley is not less than said predetermined value, said data processing system:

b5) determines a new next peak; and b6) determines if a difference between said new next peak and said subsequent valley of said damped sinusoid is less than said predetermined value, wherein if said difference between said new next peak and said subsequent valley is less than said predetermined value, said weight is determined to be equal to a median of said new next peak and said subsequent valley.

21. A system as described in claim 20 where said weight is determined only if said difference between said new next peak and said subsequent valley is greater than one-half of said difference between said next peak and said subsequent valley.

22. A system as described in claim 20, wherein if said difference between said new next peak and said subsequent valley is not less than said predetermined value, said data processing system:

b7) determines a new subsequent valley; and b8) determines if a difference between said new next peak and said new subsequent valley of said damped sinusoid is less than said predetermined value, wherein if said difference between said new next peak and said new subsequent valley is less than said predetermined value, said weight is determined to be equal to a median of said new next peak and said new subsequent valley.

23. A system as described in claim 22, wherein if said difference between said new next peak and said new subsequent valley is not less than said predetermined value, said data processing system:

b9) determines a new next peak; and b10) determines if a difference between said new next peak and said new subsequent valley of said damped sinusoid is less than said predetermined value, b11) if said difference between said new next peak and said new subsequent valley is less than said predetermined value, determines said weight to be equal to a median of said new next peak and said new subsequent valley; and b12) if said difference between said new next peak and said new subsequent valley is not less than said predetermined value, returns to step b7.

24. A system as described in claim 23, wherein said data processing system returns to step b7 a predetermined number of times, and if said weight is not determined after said predetermined number of times, said data processing system determines said weight as an average of at least a portion of medians between peaks and valleys of said damped sinusoid.

25. A system as described in claim 14, wherein said weight is determined only if a difference between a peak and valley is greater than one-half of a difference between an immediately previous peak and valley.

26. A system for calculating postage for a mail piece comprising:

a scale having a support for supporting said mail piece and a transducer for generating an output signal representative of an instantaneous response of said support and having a general waveform of a damped sinusoid; and a data processing system coupled to the scale, said data processing system, in response to said output signal from said scale, determining if a first peak of said damped sinusoid is greater than a threshold value, said threshold value corresponding to a weight break between a lowest range of weight values associated with a first postage amount and a second range of weight values associated with a second postage amount;

wherein if said first peak of said damped sinusoid is not greater than said threshold value, said data processing system determines said weight to be in said lowest range of weight values and calculates said postage for said mail piece as said first postage amount.

27. A system as described in claim 26, wherein said first peak is identified by determining when a first derivative of said damped sinusoid changes from positive to negative.

28. A system as described in claim 4, wherein if said second peak to second valley difference is not less than said predetermined value, said data processing system:

b4) determines if a difference between a third peak and said second valley in said damped sinusoid is less than said predetermined value;

b5) if said difference between said third peak and said second valley is less than said predetermined value, determines said weight to be equal to a median of said third peak and said second valley; and b6) if said difference between said third peak and said second valley is not less than said predetermined value, determines a difference between subsequent peak and valley pairs of said damped sinusoid until a difference between a corresponding peak and valley pair is less than said predetermined value, and said weight is determined to be equal to a median of said corresponding peak and valley pair.

29. A method as described in claim 11, wherein if said difference between said next peak and said subsequent valley is not less than said predetermined value, said method further comprises:

f) determining a new next peak;

g) determining if a difference between said new next peak and said subsequent valley of said damped sinusoid is less than said predetermined value; and h) determining said weight to be equal to a median of said new next peak and said subsequent valley if said difference between said new next peak and said subsequent valley is less than said predetermined value.

30. A method as described in claim 29, wherein if said difference between said new next peak and said subsequent valley is not less than said predetermined value, said method further comprises:

i) determining a new subsequent valley;

j) determining if a difference between said new next peak and said new subsequent valley of said damped sinusoid is less than said predetermined value; and k) determining said weight to be equal to a median of said new next peak and said new subsequent valley if said difference between said new next peak and said new subsequent valley is less than said predetermined value.

31. A method as described in claim 30, wherein if said difference between said new next peak and said new subsequent valley is not less than said predetermined value, said method further comprises:

l) determining a new next peak;

m) determining if a difference between said new next peak and said new subsequent valley of said damped sinusoid is less than said predetermined value;

n) determining said weight to be equal to a median of said new next peak and said new subsequent valley if said difference between said new next peak and said new subsequent valley is less than said predetermined value; and o) returning to step i if said difference between said new next peak and said new subsequent valley is not less than said predetermined value.

32. A method as described in claim 31, wherein returning to step i further comprises:

returning to step i a predetermined number of times, and if said weight is not determined after said predetermined number of times, said data processing system determines said weight as an average of at least a portion of medians between peaks and valleys of said damped sinusoid.

33. A method as described in claim 13, wherein if said second peak to second valley difference is not less than said predetermined value, said method further comprises:

d) determining if a difference between a third peak and said second valley in said damped sinusoid is less than said predetermined value;

e) determining said weight to be equal to a median of said third peak and said second valley if said difference between said third peak and said second valley is less than said predetermined value; and f) if said difference between said third peak and said second valley is not less than said predetermined value, determining a difference between subsequent peak and valley pairs of said damped sinusoid until a difference between a corresponding peak and valley pair is less than said predetermined value, and determining said weight to be equal to a median of said corresponding peak and valley pair.

34. A method for calculating postage for a mail piece comprising:

supporting said mail piece on a support of a scale;

generating an output signal representative of an instantaneous response of said support, said output signal having a general waveform of a damped sinusoid;

determining, in response to said output signal, if a first peak of said damped sinusoid is greater than a threshold value, said threshold value corresponding to a weight break between a lowest range of weight values associated with a first postage amount and a second range of weight values associated with a second postage amount;

determining said weight to be in said lowest range of weight values if said first peak of said damped sinusoid is not greater than said threshold value; and if said weight is determined to be in said lowest range of weight values, calculating said postage for said mail piece as said first postage amount.

35. A method as described in claim 34, wherein said first peak is identified by determining when a first derivative of said damped sinusoid changes from positive to negative.

36. A method as described in claim 33 where said weight is determined only if a difference between a peak and valley is greater than one-half of a difference between an immediately previous peak and valley.

37. A method as described in claim 33 wherein said difference between subsequent peak and valley pairs of said damped sinusoid is determined a predetermined number of times and then said weight is determined to be an average of said predetermined number, or a lesser number, of previous medians.

38. A system as described in claim 28 where said weight is determined only if a difference between a peak and valley is greater than one-half of a difference between an immediately previous peak and valley.

39. A system as described in claim 28 wherein said data processing system determines a difference between subsequent peak and valley pairs of said damped sinusoid a predetermined number of times and then determines said weight to be an average of said predetermined number, or a lesser number, of previous medians.

40. A method as described in claim 31 where said weight is determined only if a difference between a peak and valley is greater than one-half of a difference between an immediately previous peak and valley.

* * * * *